United States Patent [19]

Nan-Mu et al.

[11] Patent Number: 5,164,701

[45] Date of Patent: Nov. 17, 1992

[54] CAR-OPERATION-CONDITION INDICATING APPARATUS

[76] Inventors: Chiou Nan-Mu, No. 3, Alley 3, Lane 48, Chin-Chiang Street; Chiou Yun-Perng, No. 3, Alley, Lane 48, Chin-Chiang Street, both of Taipei, Taiwan

[21] Appl. No.: 516,526

[22] Filed: Apr. 30, 1990

[51] Int. Cl.⁵ ............................................. B60Q 1/50
[52] U.S. Cl. ..................................... 340/464; 340/467
[58] Field of Search ............... 340/464, 467, 458, 466, 340/463

[56] References Cited

U.S. PATENT DOCUMENTS

| | | | |
|---|---|---|---|
| 2,750,578 | 6/1956 | Petrella et al. | 340/464 |
| 3,037,188 | 5/1962 | Weigl | 340/463 |
| 3,073,922 | 1/1963 | Miller | 340/467 X |
| 3,281,786 | 10/1966 | Leichsenring | 340/464 |
| 3,364,384 | 1/1968 | Dankert | 340/464 X |
| 3,501,742 | 3/1970 | Ellison | 340/464 X |
| 3,784,974 | 1/1974 | Hamashige | 340/464 |
| 4,491,824 | 1/1985 | Chiou | 340/467 |
| 4,800,377 | 1/1989 | Slade | 340/466 |
| 4,841,276 | 6/1989 | Abel et al. | 340/466 |

Primary Examiner—Jin F. Ng
Assistant Examiner—Brian R. Tumm
Attorney, Agent, or Firm—Yuso Int'l Patent & Trademark Office

[57] ABSTRACT

An apparatus to indicate a car operating condition, which comprises a plurality of red, white and greeen warning lights mounted on the front and rear portions of a car to inform or warn an oncoming car of a trailing car about the existing driving and operation condition of the car on which the lights are installed. A set of red flashing lights is used to warn other drivers that the car is stopped or backing up; a set of white back-up lights provides an additional warning that the car is backing up. A set of green lights is used to advise other motorists that the car is moving forward in an accelerating mode. Two green flashing lights provide an indication that the car is moving forwardly without acceleration. Two continuously-on red lights are used to indicate that the car is being braked. The system of warning lights is designed to warn other motorists of the condition of the vehicle, or impending changes in the vehicle position, so that the other motorists can take action to avoid a car accident.

1 Claim, 2 Drawing Sheets

CAR-OPERATION-CONDITION INDICATING APPARATUS

BACKGROUND OF THE INVENTION

As a result of advances in technology, car speeds have been improved and increased considerably. In traffic accidents, 50.9% are rear end collissions; 48.6% are single car accidents; 0.5% are caused by other causes. The traffic accidents taking place during night time are four times higher than those in the day time, since the driver in the rear car not only has to watch the tail lights of the front car, he (or she) has to watch many situations (such as the road condition, road signs, cars coming from the opposite direction and pedestrians).

From the conventional tail lights of a car, a driver in a following car is unable to know the possible operating condition of the leading car at a short glance. The object of the present invention is to provide an apparatus, whereby the driver in a following car can at a short glance, understand the operating condition of a leading car so that the driver of the following car can take necessary action in advance.

SUMMARY OF THE INVENTION

According to the present invention, the car-operation-condition indicating apparatus can provide five different indications by using three colored lights; the five indications include car reversing, car stopping, car accelerating, car moving without accelerating, and car moving while braking. These indications can be used to warn the driver in the following car to take necessary action accordingly in an easy manner with a view to minimize the possibility of causing an accident.

In the present invention, a speed pulse generator kit is mounted on the speed detection system. The car-operation conditions are indicated with lights controlled by the switches for accelerator pedal, brake pedal, and the transmission reversing switch; each lamp in the system is connected in series with a LED which is installed on the instrument panel so as to let the driver watch the various lamps to see whether they are in normal operating condition. The headlights of a car can be operated selectively under an automatic turn-on/off system or a constant turn-on system so as to reduce the mental tension of the driver, to increase the serviceable life of the car battery, and to minimize lead pollution into the air.

According to the present invention, the various car-operation conditions are indicated with five kinds of light signals, which are the same as the conventional traffic light signals; the five light signals are further described as follows:

(1) Reversing light: White light and red flasher are used to indicate reversing. The reversing lights would not be affected by the driver operating the accelerator or the brake.

(2) Car-stop light: A red flasher is used to indicate a car stopped on a road; in that case, the car-stop light would not be affected by the driver stepping on the accelerator or brake.

(3) Accelerator light: A green light is used to indicate the front car running forward normally.

(4) Neutral gear moving (non-acceleration) light: A Green flasher is used to indicate the traffic situation ahead being indefinite or unclear; it is possible to put on a brake or to shift into a neutral gear condition.

(5) Brake light: A red light is used to indicate that brake pressure is being applied to slow down the car.

When a car mounted with the present invention runs on a road, the driver of the following car operating will, at a given distance, see clearly the operating condition of the leading car; in other words, the first front car is similar to a commander car, of which each of the operation conditions, such as accelerating, moving in nuetral gear or without acceleration braking, stopped, or reversing will be shown to the rear cars immediately; the first front car may be considered as an observation post for the following rear cars. Naturally, the drivers in the rear cars would operate their cars in the same way; consequently, the traffic situation would be controlled smoothly; braking operation will be reduced; air pollution will be reduced, and safety in life and property will also be improved.

Currently, when the tail light of a car is out of order, the driver thereof is unable to know immediately; the car is still running on the road, but the driver of the car is unaware of the defective condition. For example, the brake lights of current cars have to be inspected by a person walking to the rear of the car while another person operates the brake pedal.

In view of the aforesaid drawbacks of current cars, the inventors have developed the lamp inspection system of the present invention; each lamp of a light signal system is connected in series with a LED, which is mounted on the instrument panel. Whenever a lamp is out of order, the corresponding LED will not give light; then, the driver will know immediately which lamp is out of order so as to replace it with a new one.

Since the headlights consume considerable power, the visibility of an opposite car might be affected. According to the present invention the headlights of a car can be set in an automatic turn-on/off operation mode; a high beam or low beam light is to be set manually. Under normal road conditions, the automatic turn-on/off system in the car is used so as not to affect the visibility of another oncoming car while the car is stopped. When the car moves forward, the headlights are lit up; when the car stops, the headlights go out so as to enable the battery to have a longer effective service life, and to reduce lead pollution as well. The constant turn-on system may be used when the car is stopped to aid persons near the road, or during driving on a hazardous road.

According to the present invention, the conventional indicator light (yellow flasher) is not used. The conventional out-of-order light operated manually is deemed ineffective. For example, if a car is disabled on the modern free way, the driver may be injured seriously during the time it takes the driver to manually turn on the out-of-order light or extract the triangular warning sign from the trunk for placement behind the car; in that case, a following car may strike the disabled car to produce collision accident, if the driver of the following car makes a wrong judgment as to the situation. A car stopped suddenly on a road would be a cause of danger, since it becomes an unexpected obstacle. The present invention seeks to prevent a car stopped on a road from becoming a dangerous obstacle; an automatic red flasher is used as an out-of-order or temporary stop signal according to the present invention. The signal is automatic; it does not have to be turned on by the motorist.

DETAILED DESCRIPTION OF A PREFERRED EMBODIMENT OF THE INVENTION

Figure 1:
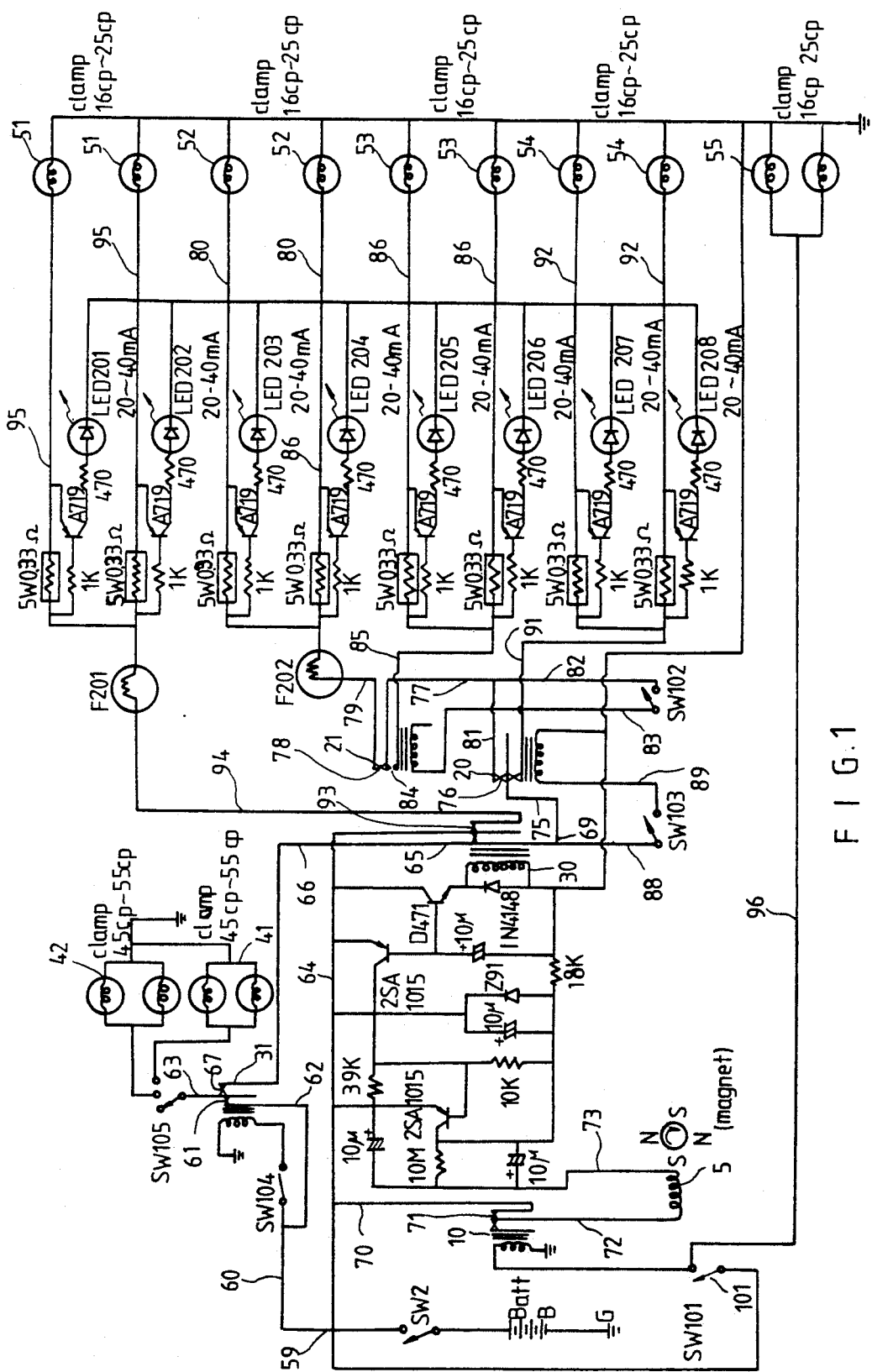
FIG. 1 is a circuit diagram of a preferred embodiment according to the present invention.
Figure 2:
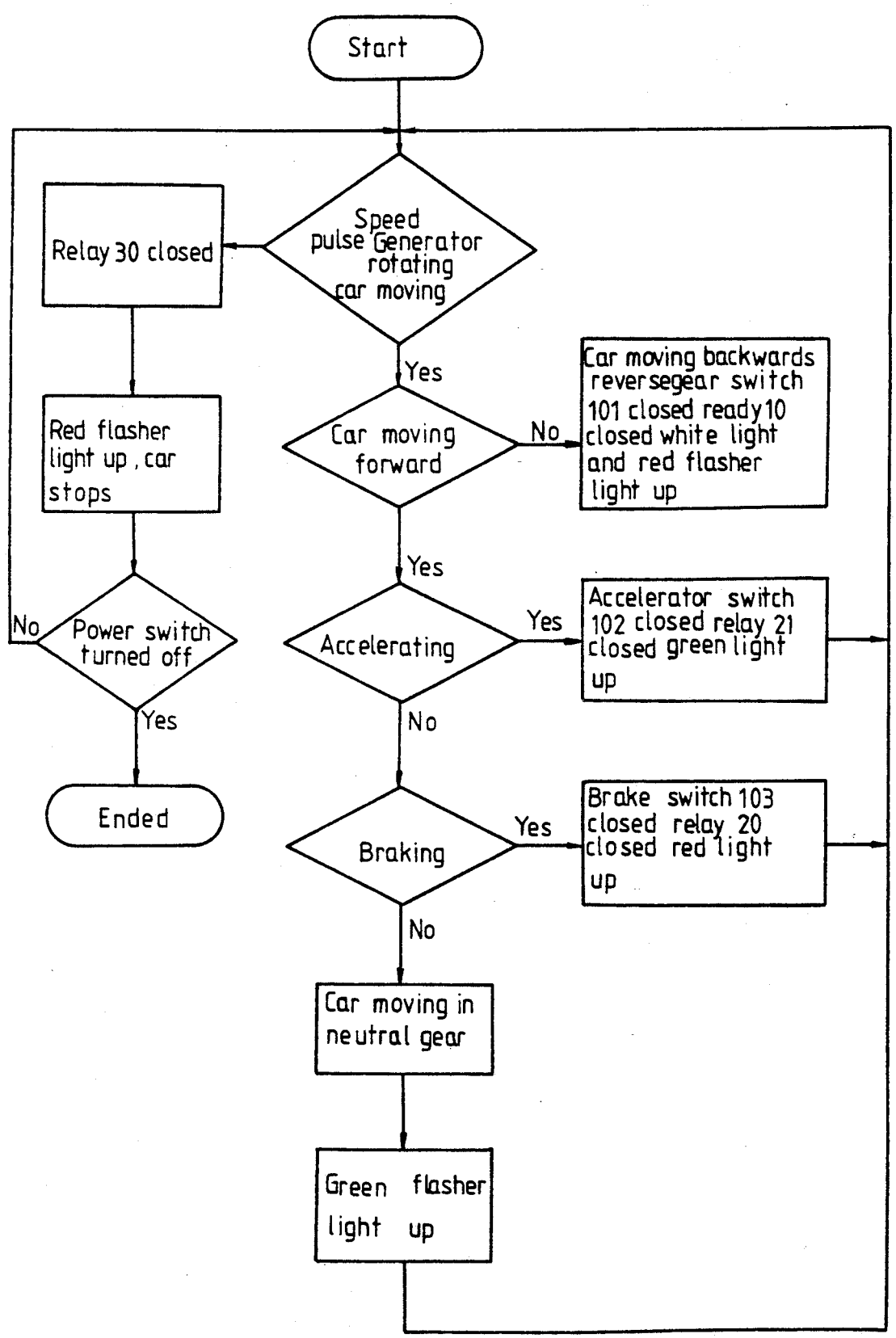
FIG. 2 is a flow chart of the light-indicating system according to the present invention.

FIG. 1 illustrates a circuit diagram of an embodiment of the present invention of which the operation can be started by turning on a car battery B with a key-operated switch SW2.

In the electrical system depicted in FIG. 1 switches SW 104 and SW 105 are manually-operated switches. Switch SW 101 is a normally-open switch that includes an actuator responsive to motion of the vehicle in the reverse direction, whereby the switch is in the circuit-closed condition when the vehicle is operating in reverse. Switch SW 102 is a normally-open switch having an actuator that responds to depression of the vehicle accelerator pedal, whereby acceleration of the vehicle closes the switch. Switch SW 103 is a normally-open switch having an actuator that responds to depression of the vehicle brake pedal, whereby foot pressure on the brake pedal closes the switch. Lamps 51, 52, 53, 54 and 55 are located on the rear end of the vehicle so as to be visible to the driver of the following vehicle. Additional lamps in parallel with lamps 51 may be located on the front end of the vehicle to warn oncoming drivers that the vehicle is in a stopped condition. Lamps 51 are flashing lamps, preferably having red lenses; these lamps are illuminated only when the vehicle is moving in the reverse direction (backing up), or when the vehicle is in a stopped condition. Lamps 55 are steady on (or off) lamps, preferably having colorless (white) lenses; these lamps are illuminated only when the vehicle is backing up. When the vehicle is backing up lamps 51 are in the flashing mode and lamps 55 are in the illuminated mode. Lamps 52 are flashing lamps, preferably having green lenses; these lamps are illuminated only when the vehicle is moving forward and there is no foot pressure on either the brake pedal or the accelerator pedal. Lamps 53 are steady on (or off) lamps, preferably having green lenses; these lamps are illuminated only when the vehicle is moving forward in an accelerating mode, i.e. when there is foot pressure on the accelerator pedal. Lamps 54 are steady on (or off) lamps preferably having red lenses; these lamps are illuminated only when the vehicle is moving forwardly in the braking mode, i.e. when there is foot pressure on the brake pedal.

The vehicle is equipped with conventional headlights, designated by numerals 41 and 42.

A control system is provided for enabling the headlights to be turned on or off via manual switch SW 105, or to be turned on and off automatically according to whether the car is moving or stationary, i.e. the headlights will be on when the car is moving and off when the car is stationary.

The manual control circuit for energizing the headlights, comprises line 60, switch SW 104 and the coil of relay 31. When switch SW 104 is manually closed, relay 31 closes a set of contacts 61, thereby enabling current to flow through line 62, contacts 61 and line 63. Manual switch SW 105 can be operated to three different positions for holding the headlights off, or for energizing the high beam lights 41, or for energizing the low beam lights 42. The manual control circuit operates whether the car is moving or stationary.

The automatic headlight control system includes a line 64, contacts 65, line 66, and contacts 67. Contacts 65 are normally open contacts that form part of a relay 30; the coil of relay 30 is energized to close contacts 65 only when the car is moving. Contacts 67 are normally closed contacts forming part of relay 31. When the car is moving an automatic headlight energizing circuit is established from junction 59, through line 64, contacts 65, line 66, contacts 67, and line 63. The setting of switch SW 105 determines whether the headlights will be energized.

The system includes an electrical sensor system that provides current at junction 69 when the car is moving in the forward direction. The sensor mechanism includes a speed pulse generator means 5 responsive to rotation of a component in the drive train to provide a current flow through a circuit that includes line 70, relay contacts 71, line 72, a sensor coil, and line 73. An amplification system supplies an amplified current to the coil of relay 30, whereby controlled contacts 65 are closed to deliver current from line 64 through contacts 65 to junction 69.

When the car is backing up (moving in a reverse direction) switch SW 101 is closed in response to motion in the reverse direction. Accordingly, the coil of relay 10 is energized to open contacts 1, thereby interrupting the energizer circuit for the coil of relay 30. Contacts 65 are opened so that junction 69 then receives no battery current.

The voltage potential at 69 supplies current to lamps 52, 53 and 54. The energizing circuit for lamps 52 comprises line 75, normally open contacts 76 of relay 20, lines 81 and 77, normally open contacts 78 of relay 21, line 79, flasher F202, and lines 80. Lamps 52 provide a visible flashing signal when the car is moving forwardly with no foot pressure on the accelerator pedal or brake pedal.

Lamps 53 are energized through a circuit that comprises junction 69, line 75, contacts 76, lines 81 and 82, accelerator switch SW 102, line 83 and the coil of relay 21. When relay 21 is energized its contacts 84 are closed to deliver current from line 77 to lamp-energizer lines 85 and 86. Lamps 53 are energized only when there is foot pressure on the accelerator pedal.

Lamps 54 are energized through a circuit that comprises junction 69, line 88, brake switch SW 103, line 89, and the coil of relay 20. When relay 20 is energized its contacts 90 are closed to complete a circuit that includes line 75, contacts 90, line 91, and lamp energizer lines 92. Lamps 54 are energized only when the driver applies foot pressure to the brake pedal.

Lamps 51 are energized only when the car is stopped or moving in reverse; under such conditions the coil of relay 30 is deenergized so that contacts 65 are opened and contacts 93 are closed. The energizer circuit for lamps 51 comprises contacts 93, line 94, flasher F 201, and lines 95.

Lamps 55 are energized only when the car is moving in the reverse direction. The lamp energizer circuit comprises switch SW 101 and line 96. Lamps 51 and 55 are illuminated together when the car is backing up. Lamps 51 preferably generate flashing red signals, whereas lamps 55 preferably generate a continuous white light signal.

The FIG. 1 circuitry includes a bulb test system for the various lamps (bulbs) 51, 52, 53 and 54. The test system will be used to test the associated lamps by means of LED 15 (light emitting diodes) located on the instrument panel. The test system includes cermet resistors, general resistors and transistors arranged so that current passing through each lamp causes the associated transistor to generate a bias to be applied to associated LED; failure of the LED to light up indicates that the lamp is not operating. The motorist can perform the testing from the driver seat. He does not have to stand outside the car and have another person operate the system from within the car.

We claim:

1. A vehicle condition indication system comprising a plurality of warning lamps located on the rear end of a vehicle to warning motorists in following vehicles of different vehicle conditions; said warning lamps comprising a first lamp (51) indicating that the vehicle is stopped or moving rearwardly, a second lamp (52) indicating that the vehicle is moving in the forward direction without acceleration, a third lamp (53) indicating that the vehicle is moving forwardly in an accelerating mode, a fourth lamp (54) indicating that the vehicle is moving forwardly while being subjected to a braking action, and a fifth lamp (55) indicating that the vehicle is moving rearwardly; said system comprising a first relay (30), means (at 5) responsive to forward motion of the vehicle to supply energizing current to said first relay, an electrical junction (69) receiving current through said first relay only when said first relay is in an energized condition; said first relay having a set of normally open contacts (65) connected to said electrical junction for delivering current thereto, and a set of normally closed contacts (93) for delivering current to said first lamp; said second, third and fourth lamps having energizer circuits connected to said junction partly in electrical parallelism to each other; a reversing switch means (SW 101) responsive to reversing motion of the vehicle to de-energize said first relay; said fifth lamp having an energizer circuit (96) connected directly to said reversing switch means without going through said electrical junction; the energizer circuit for said fourth lamp (54) comprising a brake switch (SW 103) and a second relay (20) having a coil in series with said brake switch; said second relay having a set of normally open contacts in series between said junction and said fourth lamp; the energizer circuit for said third lamp (53) comprising an accelerator switch (SW 102) and a third relay (21) having a coil in series with said accelerator switch; said third relay having a set of normally open contacts (84) in series connection with said third lamp; said second relay having a set of normally closed contacts (76); and said third relay having a set of normally closed contacts (78); the normally closed contacts of the second relay being in series connection with the normally closed contacts of the third relay to form part of the energizing circuit for said second lamp.

* * * * *